March 2, 1954 — L. H. GILPIN ET AL — 2,671,165

SYSTEM OF RADIO OR TELEVISION BROADCASTING OR TRANSMISSION

Filed Feb. 16, 1950 — 3 Sheets-Sheet 1

INVENTORS
LEVERING H. GILPIN
HERMAN L. GORDON
BY Herman L. Gordon
ATTORNEY

March 2, 1954

L. H. GILPIN ET AL

SYSTEM OF RADIO OR TELEVISION BROADCASTING OR TRANSMISSION 2,671,165

Filed Feb. 16, 1950

3 Sheets-Sheet 2

INVENTORS
LEVERING H. GILPIN
HERMAN L. GORDON

BY Herman L. Gordon

ATTORNEY

March 2, 1954

L. H. GILPIN ET AL
SYSTEM OF RADIO OR TELEVISION
BROADCASTING OR TRANSMISSION 2,671,165

Filed Feb. 16, 1950

3 Sheets-Sheet 3

INVENTORS
LEVERING H. GILPIN
HERMAN L. GORDON

BY Herman L. Gordon
ATTORNEY

Patented Mar. 2, 1954

2,671,165

UNITED STATES PATENT OFFICE 2,671,165

SYSTEM OF RADIO OR TELEVISION BROADCASTING OR TRANSMISSION

Levering H. Gilpin, Washington, D. C., and Herman L. Gordon, Silver Spring, Md., assignors to Gilpin Electronics Inc., Washington, D. C., a corporation of Delaware Application February 16, 1950, Serial No. 144,526

4 Claims. (Cl. 250—2)

This invention relates to radio and television broadcasting systems, and more particularly to a radio or television transmitting and receiving system wherein entertainment programs may be separated from advertising or other undesirable material by the automatic operation of means in the receivers, responding to control signals in the transmission.

A main object of the invention is to provide a novel and improved system of radio broadcasting and reception wherein entertainment programs, such as music or the like, may be provided to subscribers, with no commercial announcements being present in the program material heard by the subscribers, whereas, the commercial announcements are not eliminated in the case of non-subscribers receiving the program.

A further object of the invention is to provide an improved system whereby a radio broadcasting station or radio transmitter of the AM, FM or television type may transmit a program consisting of various material, such as music, speech, announcements, news, advertising, etc., and by the use of special receivers, described hereafter, enables the transmitter to predetermine and control what portion or parts of the total program the special receivers will reproduce at various times during any period of time.

A still further object of the invention is to provide an improved system of broadcasting of the above character, wherein variable coded signals are employed in the transmission to control the special receivers, the coded signals being readily changed from time to time in such manner as to make it impossible for receivers other than the special receivers of the system to respond to the coded signals.

A still further object of the invention is to provide an improved broadcasting system wherein coded signals are employed to control special receivers, the signals being of such character as to make their detection very difficult, and the coding being variable in a very simple and effective manner, so that those who are not subscribers to the system will have great difficulty in enjoying its benefits.

Further objects and advantages of the invention will become apparent from the following description and claims, and from the accompanying drawings, wherein:

Figures 1, 2:
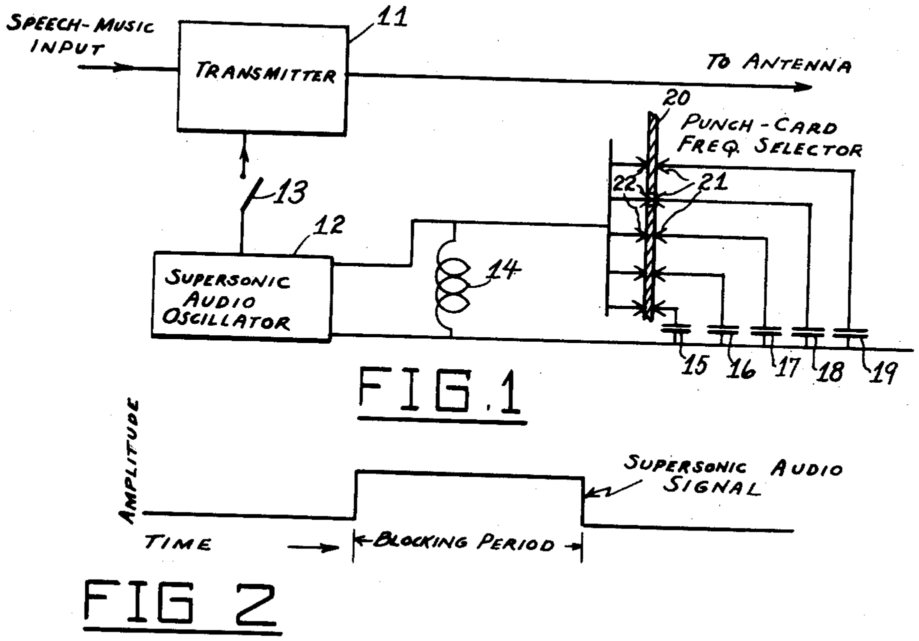
Figure 1 is a block diagram illustrating a transmitter coding arrangement according to the present invention.
Figure 2 is a graph illustrating the shape of the envelope of the coding signal obtained by the apparatus of Figure 1.

Referring to the drawings, and more particularly to Figures 1 to 3, 11 designates a conventional transmitter provided with the usual components, such as an input audio amplifier, an oscillator which generates the carrier, a modulator for impressing the audio signal on the carrier, and an RF power output stage from which the modulated carrier is delivered to the antenna. Designated at 12 is a supersonic audio oscillator which is connected to the audio circuit at the input portion of the transmitter through a control switch 13, so that when switch 13 is closed, the output of oscillator 12 is impressed on the carrier, along with the speech or music program modulations. The frequency of oscillator 12 is controlled by a tuned circuit which includes in parallel an inductance 14 and any one of the different-valued capacitors 15 to 19, selection of one of said capacitors being accomplished by means of a punched card 20 which is inserted between spring contacts, shown diagrammatically at 21, 22, the card 20 being formed with an aperture through which a desired set of spring contacts 21, 22 may engage each other, as shown in Figure 1. The contacts 21 are respectively connected to one terminal of the respective tuning capacitors 15 to 19, whereas the contacts 22 are connected to one terminal of the inductance 14, the other terminal of the inductance being connected to the opposite terminals of the tuning capacitors. The frame of the apparatus is provided with suitable receiving means, not shown, for the card 20, said receiving means being provided with stops arranged to suitably locate the card so that connection of a desired tuning capacitor to the inductance will occur by the interengagement of the corresponding contacts 21, 22 through the aperture in the card when said card is seated in the receiving means. By substituting another card 20 having its aperture located differently, a different tuning capacitor may be connected to the inductance 14, thereby changing the frequency of the oscillator 12. The frequency of the oscillator 12 may thus be readily changed by changing the punched cards 20. In the typical arrangement of Figure 1, there may be five different punched cards, the aperture of each card being located so as to align with a different set of spring contacts 21, 22 when the card is seated in the receiving means. Thus, the oscillator 12 may have any one of five different supersonic audio frequencies.

As above stated, the supersonic audio frequency is impressed on the transmitter carrier during the time that switch 13 is closed. In Figure 2, this time is designated as the "blocking period," and it will be seen that the amplitude of the supersonic signal impressed on the carrier is zero while switch 13 is open, and remains at a constant substantial level during the time switch 13 is closed, namely, during the "blocking period."

Figure 3:
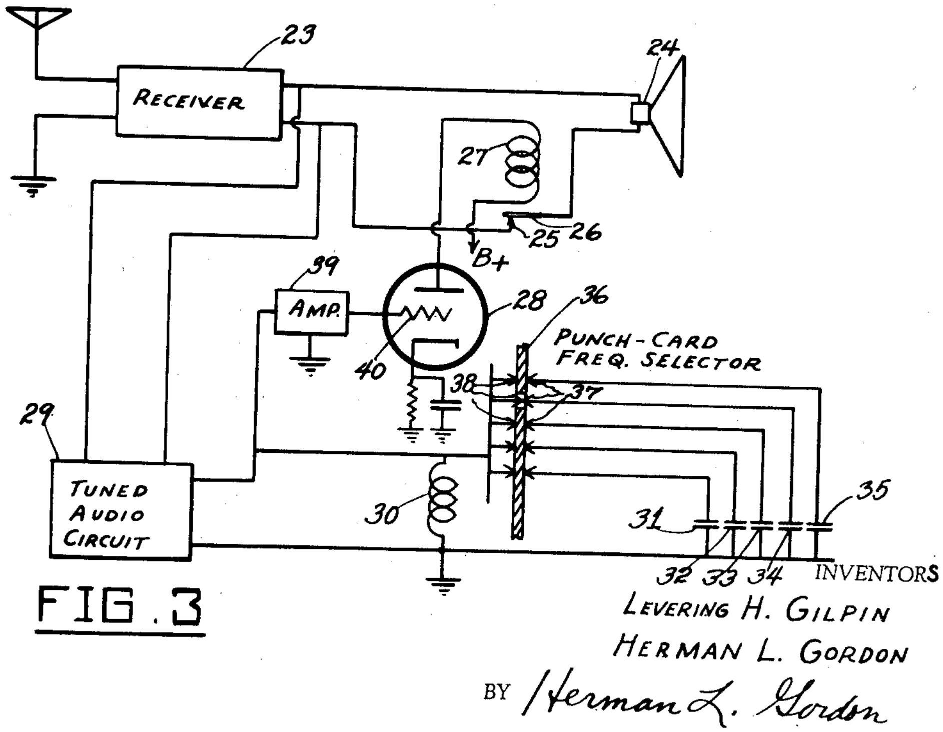
Figure 3 is a schematic diagram of a special receiver arranged to respond to the coding signal of Figures 1 and 2.

Referring now to Figure 3, it will be seen that a receiving arrangement adapted to respond to the signals produced by the arrangement of Figure 1 may comprise a conventional receiver 23 whose audio output is connected to the voice coil of a loud speaker 24 through relay contacts 25, 26, said contacts being normally closed, but being opened when the relay coil, shown at 27, becomes energized. Said relay coil is connected in the plate circuit of a triode 28. Designated at 29 is a tuned audio circuit whose input circuit is connected to the audio output circuit of receiver 23 ahead of the contacts 25, 26. The resonant frequency of the tuned circuit 29 is controlled by a parallel tuning circuit comprising an inductance 30 and any one of a plurality of different-valued capacitors 31 to 35. Selection of a tuning capacitor is accomplished by a punched card 36 similar to the punched card 20 at the transmitter. The punched card 36 is inserted between spring contacts 37, 38, the respective contacts 37 being each connected to one ungrounded terminal of the respective capacitors 31 to 35 and the contacts 38 being connected to the ungrounded terminal of the inductance 30, said ungrounded terminal being connected through an amplifier 39 to the grid 40 of triode 28. The card 36 is provided with locating means arranged so that connection of a desired tuning capacitor to the inductance 30 will occur by the engagement of the corresponding contacts 37, 38 through the aperture in the card when said card is placed in its locating means. In the typical arrangement shown, there are five different cards, corresponding to the five cards available at the transmitter. When corresponding cards are employed at the transmitter and the receiver, the particular capacitor connected to inductance 30 will have a value such as to resonate the tuned circuit 29 to the particular frequency of the supersonic audio oscillator 12 at the transmitter. Triode 28 is biased so as to be non-conducting except when a peak signal is applied to grid 40. Such a signal is provided when switch 13 at the transmitter is closed. When triode 28 conducts, relay coil 27 becomes energized and opens contacts 25, 26, thereby opening the circuit of the loud speaker 24.

Therefore, loud speaker 24 is cut out during the "blocking period," which may be the period during which advertising or other announcements undesired by the subscriber, are transmitted. During said period, the transmitter operator closes switch 13, thereby preventing the announcements from being reproduced at the special receiver.

The punched cards 20 and 36 are changed from time to time, thereby changing the frequency of the supersonic control signal and preventing non-subscribers from enjoying continuous free benefits from the system, assuming that such non-subscribers have located the frequency of one control signal and have inserted a speaker control circuit resonant thereto in their receivers.

Figures 4, 5, 6, 13:
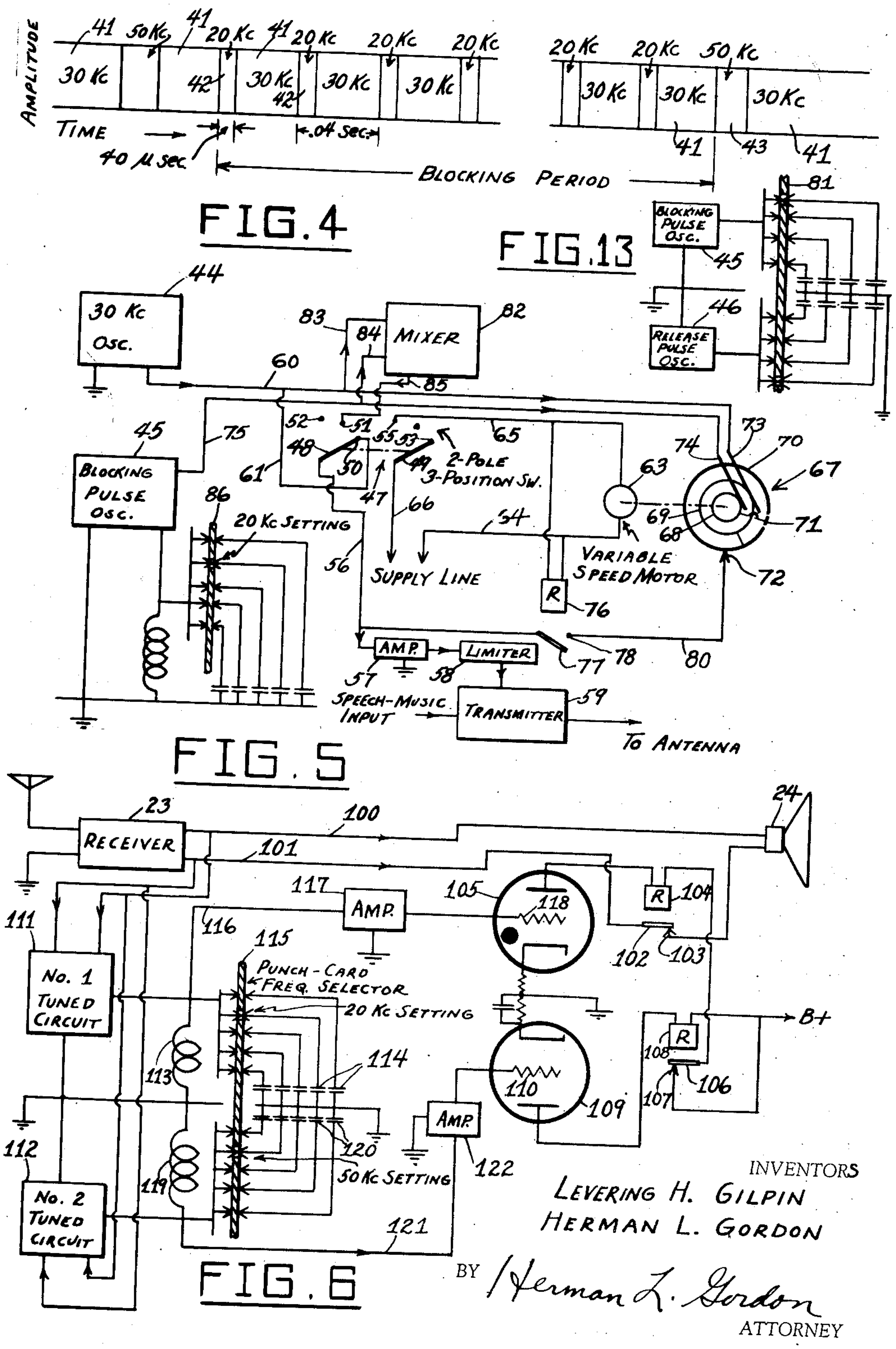
Figure 4 is a graph illustrating a modified form of coding signal employed in accordance with the present invention.
Figure 5 is a schematic diagram illustrating one form of transmitter coding arrangement adapted to provide the coded signal of Figure 4.
Figure 6 is a schematic diagram of a special receiver arranged to respond to the coded signal of Figure 4.
Figure 13 is a diagrammatic view showing the punch-card frequency-selecting means which may be employed with the arrangement of Figure 7.
Figures 7, 8, 9, 10, 11, 12:
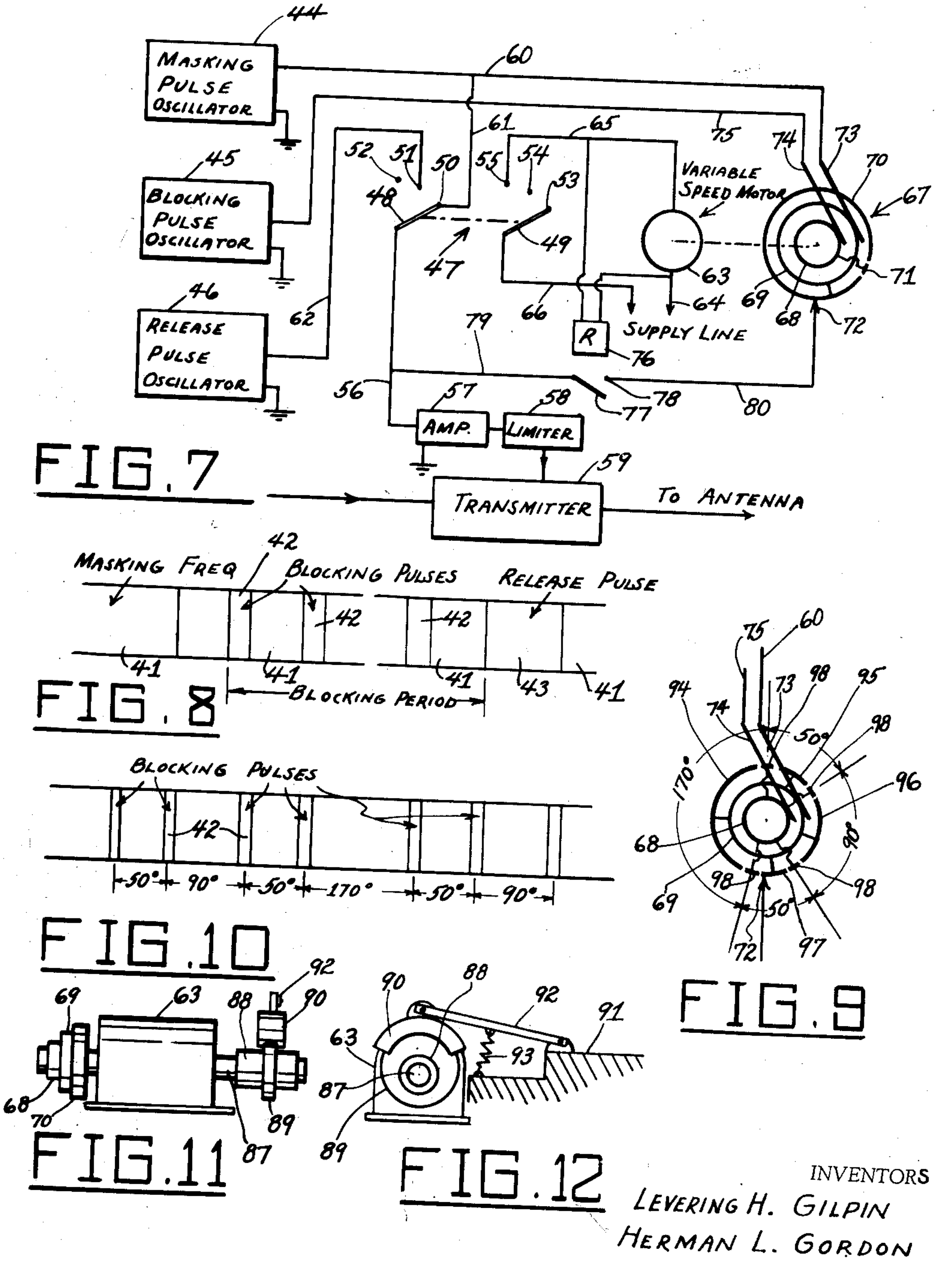
Figure 7 is a schematic diagram of a more generalized form of transmitter coding arrangement adapted to provide a coded signal.
Figure 8 is a graph illustrating the generalized coded signal obtained by the arrangement of Figure 7.
Figure 9 is a schematic view illustrating a modified form of pulsing commutator which may be employed in the arrangement of Figures 5 or 7 in accordance with the present invention.
Figure 10 is a graph illustrating the coding signal obtained by the use of the pulsing commutator of Figure 9.
Figure 11 is a side elevational view of a variable-speed pulsing motor which may be employed in driving the pulsing commutator of the system illustrated in Figures 5, 7 or 9.
Figure 12 is a diagrammatic end elevational view of the variable-speed pulsing motor of Figure 11.

Referring now to Figures 6, 7 and 8, a modified form of radio broadcasting and receiving system according to the present invention is illustrated, wherein a continuous supersonic signal may be impressed on the carrier along with the normal audio modulations. As shown in Figure 8, the supersonic signal comprises a background frequency 41 which is designated in Figure 8 as the "masking frequency." During the "blocking period," the "masking frequency" is replaced for short intermittent periods by pulses of a different supersonic frequency 42, designated as "blocking pulses." At the end of the "blocking period," the "masking frequency" is replaced for a short interval by still another supersonic frequency 43, designated as the "release pulse." The amplitude of the supersonic wave remains constant at all times, including the times when the blocking pulses 42 and the release pulse 43 are present.

Figure 7 discloses schematically a transmitter arrangement for producing the supersonic signal of Figure 8 and impressing said signal on a transmitter carrier. Designated at 44 is the "masking pulse" oscillator, which generates the background supersonic frequency 41. Designated at 45 is the "blocking pulse" oscillator, which generates a supersonic frequency 42 differing from the background frequency. Designated at 46 is the "release pulse" oscillator which generates the third supersonic frequency 43 of Figure 8.

Shown at 47 is a two-pole, three-position switch whose poles are designated respectively at 48 and 49. Associated with pole 48 are the respective stationary contacts 50, 51 and 52, and associated with the pole 49 are the respective stationary contacts 53, 54 and 55. It will be seen that pole 48 is connected by a wire 56 through an amplifier 57 and a limiter 58 to the audio input circuit of the transmitter 59. The output of the masking oscillator 44 is connected by wires 60 and 61 to the stationary switch contact 50. The output of the release oscillator 46 is connected by a wire 62 to the contact 51.

Designated at 63 is a motor. One terminal of the motor 63 is connected to one supply line wire 64, as shown. The other terminal of the motor is connected by a wire 65 to the stationary switch contact 55. The switch pole 49 is connected to the remaining supply line wire 66.

Coupled to the shaft of the motor 63 is a commutator 67. Said commutator is provided with the continuous slip rings 68 and 69, and with a discontinuous slip ring 70 which has located between its ends and insulated therefrom a very short contact segment 71. Segment 71 is electrically connected to slip ring 68, and the discontinuous slip ring 70 is electrically connected to slip ring 69. A stationary brush 72 engages the periphery of slip ring 70 and momentarily engages the segment 71 once during each revolution of the commutator 67. As shown in Figure 7, wire 60 is connected to a stationary brush 73 which engages slip ring 69. Engaging the slip ring 68 is a stationary brush 74 which is connected by a wire 75 to the output of the blocking pulse oscillator 45.

Connected across the wires 65 and 64 is a relay 76 provided with an armature 77 which engages a contact 78 when the relay is energized. Armature 77 is connected by a wire 79 to wire 56. Contact 78 is connected by a wire 80 to the brush 72.

When the switch poles 48 and 49 are in their normal positions, shown in Figure 7, motor 63 is deenergized and the output of the background oscillator 44 is connected through wires 60, 61, contact 50, pole 48, wire 56, amplifier 57 and limiter 58 to the audio input circuit of the transmitter 59. Assume now that the poles 48 and 49 are rotated to respectively engage the uppermost contacts 52 and 55. Motor 63 now becomes energized through a circuit comprising line wire 64, the motor winding, wire 65, contact 55, pole 49 and line wire 66. At the same time, relay 76 becomes energized, since it is connected in parallel with the motor, and armature 77 engages contact 78, connecting brush 72 to the audio output wire 56. Motor 63 rotates commutator 67. While brush 72 engages split ring 70, the output of the masking pulse oscillator 44 is connected to wire 56 by wire 60, brush 73, slip ring 69, split ring 70, brush 72, wire 80, armature 77 and wire 79. Each time the short segment 71 is engaged by brush 72, however, the output of the blocking pulse oscillator 45 is connected to wire 56, in place of the masking frequency, by wire 75, brush 74, slip ring 68, segment 71, brush 72, wire 80, armature 77 and wire 79. This provides the blocking pulses in Figure 8.

At the end of the blocking period, the operator rotates the poles 48, 49 to engage the respective intermediate contacts 51, 54. This deenergizes motor 63 and relay 76, disconnecting brush 72 from wire 56 by the release of armature 77. At the same time, the output of the release oscillator 46 is connected to wire 56 by wire 62, contact 51 and pole 48. This provides the release pulse 43 at the end of the blocking period in Figure 8.

After a short interval, the operator restores poles 48, 49 to their initial positions, shown in Figure 7, wherein the output of the masking oscillator 44 is again connected to wire 56 by wire 61 and pole 48. The release interval may be merely that involved in rotating the poles of the switch from contacts 52, 55 through contacts 51, 54 to contacts 50, 53.

The oscillators 45 and 46 are preferably provided with punch-card frequency-selecting means such as employed with the oscillator 12 of Figure 1. Furthermore, a single punch card 81 having two apertures may be employed to simultaneously select the frequencies of both oscillators 45 and 46, as shown in Figure 13.

Figure 5 illustrates a modified form of the arrangement of Figure 7, wherein a mixer 82 is employed in conjunction with the background oscillator 44 and the blocking pulse oscillator 45 to provide the release pulse 43. As shown in Figure 5, the output wires 60 and 75 are connected to the input grids of the mixer 82 by respective wires 83 and 84. The output wire 85 of the mixer is connected to the switch contact 51. Hence, a heterodyne frequency of the background and blocking frequencies will be furnished to output wire 56 when pole 48 engages contact 51.

In Figure 5, a punched card frequency-selecting arrangement is provided for the blocking pulse oscillator 45, similar to that provided for the oscillator 12 of Figure 1. The punched card, shown at 86, may be readily changed to thereby vary the blocking pulse frequency and also the heterodyne frequency supplied by the mixer 82. In Figure 5, the background oscillator 44 is designated as providing, by way of example, a 30 kc. output frequency, and the punched card 86 is apertured so as to select a frequency of 20 kc. for the blocking pulse oscillator. The mixer 82 therefore provides beat frequencies of 50 kc. and 10 kc. As will be subsequently described, the receiver is arranged to respond to only one of the beat frequencies, for example, to the 50 kc. frequency, and hence, the 10 kc. beat frequency will be ineffective and can be ignored. Figure 4 therefore may be considered as showing the nature of the effective supersonic signal provided on the transmitter carrier by the arrangement of Figure 5, immediately prior, during, and immediately subsequent to the blocking period, produced by manipulation of the switch 47 in the manner described in connection with Figure 7.

Merely by way of illustrating the relative time durations of the blocking pulses 42 and the intervening background pulses 41 during the blocking period, it is assumed that the commutator 67 of Figure 5 rotates at a speed of 25 revolutions per second and that the brush 72 engages segment 71 during a one-thousandth part of each revolution. The duration of the blocking pulse will therefore be of the order of 40 microseconds, and the time between successive blocking pulses will be .04 second, the background frequency being furnished during the time intervening between blocking pulses.

The speed of rotation of the commutator should be such that the average frequency of the blocking pulses is below the audible range, i. e., below about 30 cycles per second. It is also very desirable to make the blocking pulses 42 occur in a non-periodic manner. One method of obtaining this result is to vary the speed of the motor 63 in a random fashion. This may be accomplished by employing a motor having a variable speed control means, such as a speed-controlling rheostat, and by varying the setting of the rheostat manually during the period of energization of the motor. Another method of providing substantially random speed variation of the motor is to employ a motor having poor speed stability under load and to load the motor mechanically in an irregular manner, as illustrated for example in Figures 11 and 12. The motor shaft, shown at 87, carries a sleeve member 88 making a relatively loose frictional fit with the shaft, the friction between the sleeve and the shaft, however, being sufficiently great to retard the motor when rotation of the sleeve is retarded by an external load. Sleeve 88 carries an eccentric 89. Engaging the periphery of eccentric 89 is a friction shoe 90 connected to an adjacent stationary support 91 by a link rod 92. A spring 93 connects rod 92 to the support 91, providing variable braking force on the eccentric 89 as the eccentric is rotated by its frictional coupling with shaft 87. A substantially random retarding load is therefore applied to the motor shaft, causing the speed of the motor to vary in an irregular manner.

A still further method of making the blocking pulses 42 occur in a substantially non-periodic manner is to employ a commutator such as is shown in Figure 9, preferably in conjunction with a motor having poor stability. The commutator of Figure 9 is provided with a plurality of large segments 94 to 97, having different lengths, said large segments being each electrically connected to the slip ring 69. Between the ends of adjacent large segments are the very small segments 98, each connected to the slip ring 68. Figure 9 illustrates the angular displacement between successive small segments 98 in a typical arrangement. Figure 8 diagrammatically illustrates the sequence of blocking pulses 42 obtained by employing the commutator arrangement of Figure 9.

In the arrangement of Figure 9, the rotational speed of the commutator should be low enough to make the average frequency of the blocking pulses 42 subsonic.

Referring now to Figure 6, a receiver arrangement is disclosed adapted to respond to the control signals obtained from the transmitter arrangements of Figure 5 or 7, iwth or without the modifications disclosed by Figures 9, 11 and 12. Designated at 23 is a conventional receiver whose audio output is connected by wires 100 and 101 to the voice coil of a loud speaker 24 through relay contacts 102, 103, said relay contacts being normally closed but being opened when the relay 104 becomes energized. Said relay 104 is connected in the plate circuit of a gas triode 105, and included in said plate circuit are the normally closed contacts 106, 107 of another relay 108. Relay 108 is connected in the plate circuit of a triode 109, the triode 109 being biased so as to be normally non-conducting, whereby relay 108 is normally deenergized. Triode 109 conducts only when a substantially high-level signal is applied to its grid 110.

Designated at 111 and 112 are respective tuned circuits whose input terminals are respectively connected to the audio output wires 100 and 101 of the receiver 23. Circuit 111 is tuned by a parallel tuning circuit comprising an inductance 113 and any one of a plurality of differently-valued capacitors 114, which are selected by a punched card 115, similar to the punched card 81 of Figure 13. The punchard card 115 is adapted to select a capacitor 114 suitable for resonating circuit 111 to the supersonic frequency of the blocking pulses 42. The ungrounded output terminal of tuned circuit 111 is connected by a wire 116 through an amplifier 117 to the grid 118 of the gas triode 105. When blocking pulses 42 are present in the audio output of receiver 23, a signal of high amplitude is applied to grid 118, causing tube 105 to fire. This energizes relay 104, opening the loud speaker circuit at contacts 102, 103.

Circuit 112 is tuned by a parallel tuning circuit comprising an inductance 119 and any one of a plurality of different-valued capacitors 120, which are selected by the punched card 115. Card 115 is adapted to select a capacitor 120 suitable for resonating circuit 112 to the supersonic frequency of the release pulse 43. The ungrounded output terminal of tuned circuit 112 is connected by a wire 121 through an amplifier 122 to the grid 110 of the triode 109. When a release pulse 43 is present in the audio output of receiver 23, a high-amplitude signal is applied to grid 110, causing tube 109 to conduct.

At the beginning of the blocking period, tube 105 is triggered into conduction, causing relay 104 to open contacts 102, 103, deenergizing the loud speaker 24. Relay 104 remains energized throughout the blocking period, since tube 105 continues to conduct. At the end of the blocking period, a release pulse 43 causes triode 109 to conduct, thereby energizing relay 108, opening the plate circuit of gas triode 105 at contacts 106, 107. At the termination of the release pulse 43, gas triode 105 remains non-conducting, since no further triggering pulses 42 are present in the audio output of receiver 23. Therefore contacts 102, 103 remain closed, restoring the continuity of the loud speaker voice coil circuit.

It will be understood that in either of the receiver arrangements of Figures 3 or 6, the circuit to be controlled may be any circuit which will deenergize the reproducing portion of the receiver when opened, and the present invention is not limited to control only of the loud speaker voice coil circuits.

It is also further contemplated that the two-pole, three-position switch 47 employed in Figures 5 and 7 may be of the continuously rotatable type, whereby poles 48, 49 may be rotated from engagement with contacts 50, 53 to engagement with contacts 52, 55 without engaging the contacts 51, 54 when the blocking period is initiated, thereby preventing the transmission of a release pulse 43 at the beginning of the blocking period.

While certain specific embodiments of an improved system for separating entertainment programs from speech, such as advertising and the like, in radio and television transmission and reception have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination with a radio transmitter, a first oscillator adapted to produce a signal of a first supersonic audio frequency, a second oscillator adapted to produce a signal of supersonic audio frequency, a tuned circuit associated with said second oscillator in frequency-controlling relationship therewith, said tuned circuit including a first reactance, a plurality of additional reactances, means for selectively connecting said additional reactances to said first reactance, said means comprising opposing switch contacts connected respectively to said first reactance and to each of the additional reactances, and a card formed with a perforation, said card being receivable between said opposing switch contacts with said perforation in registry with one set of opposing contacts, whereby a selected one of said additional reactances is connected to said first reactance, a cyclically driven mechanical switch connected between said oscillators and said transmitter, means on said switch for alternately connecting the oscillators to the transmitter, means providing a signal of a third supersonic audio frequency, multiple-position mechanical switch means, circuit means connecting said cyclically driven mechanical switch to the transmitter when said multiple-position switch means is in a first position, additional circuit means selectively connecting said first oscillator or said third named means to said transmitter when the multiple-position switch means is in other positions, and means disconnecting said cyclically driven mechanical switch from the transmitter when said multiple-position switch means is in any one of said other positions.

2. The structure of claim 1, and an amplitude limiter connected between said cyclically driven switch and the transmitter.

3. The structure of claim 1, and wherein said cyclically driven switch comprises a rotating commutator having two segments, one connected to each oscillator, and a stationary brush element alternately engageable with said segments and connected to the transmitter.

4. The structure of claim 3, and wherein the segment connected to the first oscillator is relatively long and the segment connected to the second oscillator is relatively short.

LEVERING H. GILPIN.
HERMAN L. GORDON.

References Cited in the file of this patent

UNITED STATES PATENTS

| Number | Name | Date |
|---|---|---|
| 1,851,514 | Horton | Mar. 29, 1932 |
| 2,068,227 | Cutler | Jan. 19, 1937 |
| 2,166,691 | Pare | July 18, 1939 |
| 2,175,847 | Mathes | Oct. 10, 1939 |
| 2,262,766 | Jansson | Nov. 18, 1941 |
| 2,282,102 | Tunick | May 5, 1942 |
| 2,294,129 | Purington | Aug. 25, 1942 |
| 2,333,992 | Fox | Nov. 9, 1943 |
| 2,392,672 | Koch | Jan. 8, 1946 |
| 2,397,475 | Dinga | Apr. 2, 1946 |
| 2,480,115 | Brown et al. | Aug. 30, 1949 |
| 2,482,039 | Thompson | Sept. 13, 1949 |
| 2,490,022 | Atkins | Dec. 6, 1949 |
| 2,495,452 | Grove | Jan. 24, 1950 |
| 2,509,716 | Aubert | May 30, 1950 |
| 2,523,315 | Mayle | Sept. 26, 1950 |
| 2,554,329 | Hammond | May 22, 1951 |